United States Patent
Kim

(10) Patent No.: US 7,324,471 B2
(45) Date of Patent: Jan. 29, 2008

(54) APPARATUS AND METHOD FOR SUPPRESSING INTERFERENCE OF REVERSE LINK IN IN-BUILDING MOBILE COMMUNICATION SYSTEM

(75) Inventor: Kyung-Hwan Kim, Suwon-shi (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 1079 days.

(21) Appl. No.: 10/245,402

(22) Filed: Sep. 18, 2002

(65) Prior Publication Data

US 2003/0103474 A1    Jun. 5, 2003

(30) Foreign Application Priority Data

Sep. 26, 2001    (KR) .............................. 2001-59788

(51) Int. Cl.
*H04B 7/216*    (2006.01)
(52) U.S. Cl. .................. 370/320; 455/11.1; 455/16
(58) Field of Classification Search ................ 370/315, 370/320; 455/20, 11.1, 16
See application file for complete search history.

(56) References Cited

U.S. PATENT DOCUMENTS

| | | | | |
|---|---|---|---|---|
| 6,684,058 B1* | 1/2004 | Karacaoglu et al. | .......... | 455/20 |
| 6,839,539 B2* | 1/2005 | Durrant et al. | ............ | 455/11.1 |
| 2002/0028655 A1* | 3/2002 | Rosener et al. | ............... | 455/16 |

OTHER PUBLICATIONS

An article authored by Howard et al., published in May 1996 in IEEE Journal on Selected Areas in Communications, vol. 14, No. 4, and entitled *A CDMA-Distributed Antenna System for In-Bulding Personal Communication Services*.

* cited by examiner

*Primary Examiner*—Chi Pham
*Assistant Examiner*—Albert T. Chou
(74) *Attorney, Agent, or Firm*—Robert E. Bushnell, Esq.

(57) ABSTRACT

An in-building mobile communication system. The in-building mobile communication system comprising a transmission/reception repeater for performing both transmission and reception via an antenna, with respect to a terminal, the transmission/reception repeater being installed in the center of a building, at least one transmission repeater for performing only transmission, with respect to the terminal, which is installed a certain preset distance away from the transmission/reception repeater, the transmission repeater facing the transmission/reception repeater, at least one transmitter/receiver unit connected in parallel with the repeaters, and a base station device connected with the transmitter/receiver unit.

15 Claims, 4 Drawing Sheets

APPARATUS AND METHOD FOR SUPPRESSING INTERFERENCE OF REVERSE LINK IN IN-BUILDING MOBILE COMMUNICATION SYSTEM

CLAIM OF PRIORITY

This application claims priority to an application entitled "APPRATUS AND METHOD FOR SUPPRESSING INTERFERENCE OF REVERSE LINK IN IN-BUILDING MOBILE COMMUNICATION SYSTEM", filed in the Korean Industrial Property Office on Sep. 26, 2001 and assigned Ser. No. 2001-59788, the contents of which are hereby incorporated by reference.

BACKGROUND OF THE INVENTION

1. Technical Field

The present invention relates to an apparatus and a method suppressing interference of a signal received in a reverse link in a communication system in a closed space such as a building.

2. Related Art

Typically, a mobile communication system installed in a closed space such as a building (referred to hereinafter as "in-building mobile communication system") needs a plurality of small repeaters and antennas.

A code division multiple access (CDMA) in-building mobile communication system can be used to facilitate communications between mobile telephones, for example. In such an in-building mobile communication system, a large number of small repeaters can be installed. Each of these repeaters can have an antenna for transmitting signals and for receiving signals.

In the communication system that has the large number of repeaters for transmitting and receiving signals, however, there can be a problem of increased reception interference of the reverse link in proportion to the number of the antennas.

An exemplar of a recent effort in the art includes a paper by Howard H. Xia et al. entitled "A CDMA-Distributed Antenna System for In-Building Personal Communications Services" published in the Institute of Electrical and Electronics Engineers (IEEE) Journal on Selected Areas in Communications, Vol. 14, No. 4, May 1996, pp. 644-650.

While this recent effort may provide advantages, I note that it fails to adequately provide an apparatus and method for efficiently and conveniently suppressing interference of reverse link in in-building mobile communication systems.

SUMMARY OF THE INVENTION

Therefore, the present invention has been made in view of the above problems, and it is an object of the present invention to provide an apparatus and method capable of suppressing interference of a reception signal in an in-building mobile communication system.

It is another object of the present invention to provide an apparatus and method capable of suppressing reverse link interference in an in-building mobile communication system by the use of antennas installed for releasing external radio waves to the exterior of the building, the antennas being connected to repeaters which are designed for only transmission.

It is yet another object of the present invention to provide an apparatus and method capable of suppressing interference of a received signal in an in-building mobile communication system by arranging small repeaters for both transmission and reception or small repeaters for only transmission, according to exiting design features of a building, the repeaters being connected to antennas.

In accordance with the present invention, the above objects can be accomplished by the provision of an in-building mobile communication system according to an embodiment of the invention, comprising a transmission/reception repeater for performing both transmission and reception via an antenna, with respect to a terminal, the transmission/reception repeater being installed in the center of a building; at least one transmission repeater for performing only transmission, with respect to the terminal, which is installed at a certain preset distance away from the transmission/reception repeater, the transmission repeater facing the transmission/reception repeater; at least one transmitter/receiver unit connected in parallel with the repeaters; and a base station device connected with the transmitter/receiver unit.

To achieve these and other objects in accordance with the principles of the present invention, as embodied and broadly described, the present invention provides an in-building mobile communication system, the system comprising: a first transmission/reception repeater being installed substantially at a center of a building, said first transmission/reception repeater performing transmission to a plurality of terminals through a transmission/reception antenna and performing reception from a plurality of terminals through the transmission/reception antenna; at least one transmission repeater being installed a preset distance away from said first transmission/reception repeater, said at least one transmission repeater performing transmission to at least one of the terminals, said at least one transmission repeater not performing reception from any of the terminals; at least one transmitter/receiver unit being connected in parallel with said first transmission/reception repeater and with said at least one transmission repeater; and a base station device being connected with said at least one transmitter/receiver unit.

To achieve these and other objects in accordance with the principles of the present invention, as embodied and broadly described, the present invention provides a method, comprising: suppressing interference of a reverse reception signal in an in-building mobile communication system having at least one repeater performing mobile communication with a terminal, at least one transmitter/receiver unit connected with the at least one repeater, and a base station device connected with the at least one transmitter/receiver unit, said suppressing comprising: performing forward and reverse communication with the terminal through a transmission/reception repeater installed substantially at a center of a building; and performing forward communication with the terminal through a transmission repeater installed a preset distance away from the transmission/reception repeater.

To achieve these and other objects in accordance with the principles of the present to invention, as embodied and broadly described, the present invention provides a communication apparatus, comprising: at least one transmission/reception repeater being installed substantially at a center of a building, said first transmission/reception repeater performing transmission to a plurality of terminals through a transmission/reception antenna and performing reception from a plurality of terminals through the transmission/reception antenna; and at least one transmission repeater being installed at least a preset distance away from said first transmission/reception repeater, said at least one transmission repeater performing transmission to at least one of the terminals, said at least one transmission repeater not performing reception from any of the terminals.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
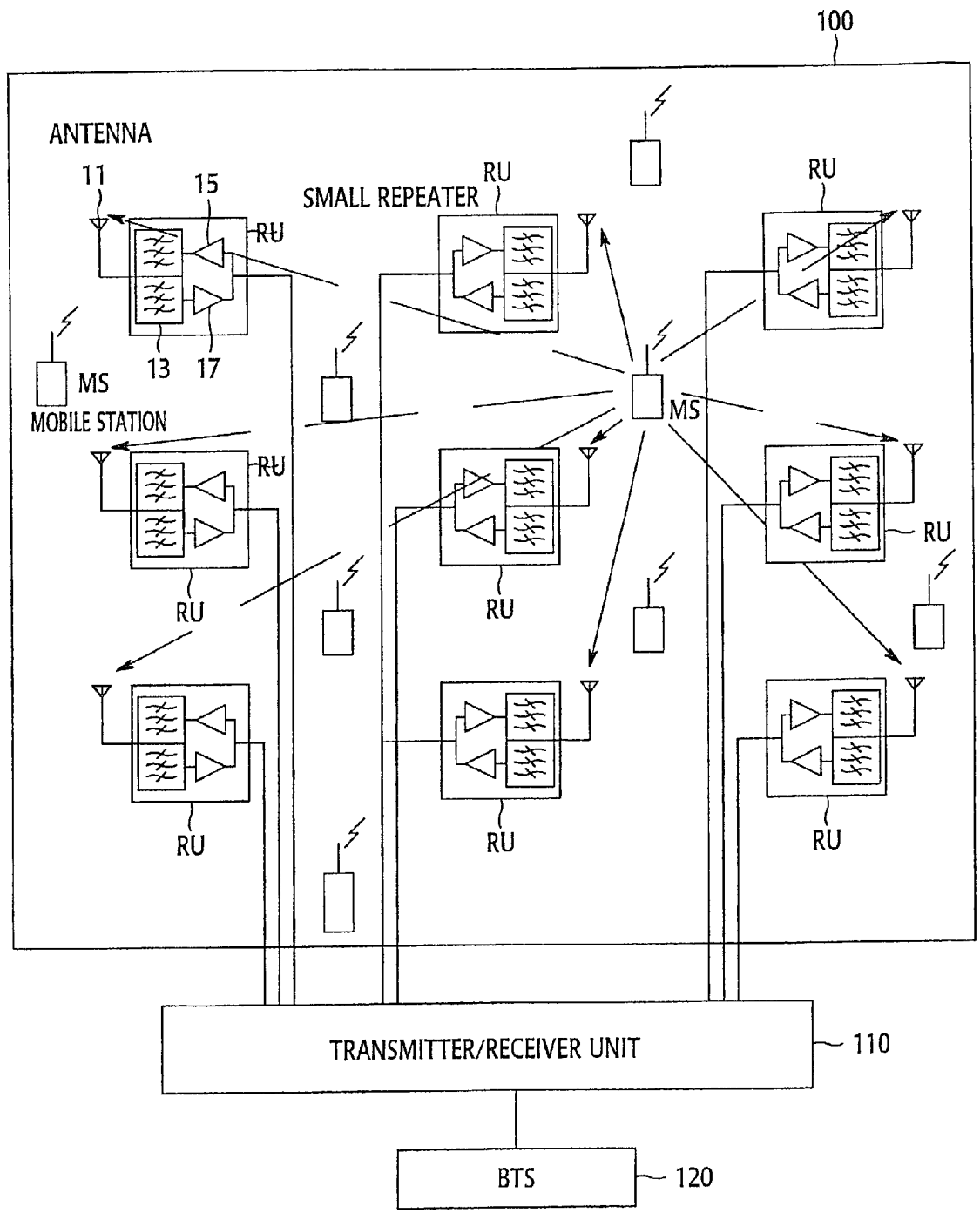
FIG. 1 is a view illustrating a configuration of a code division multiple access (CDMA) communication system installed in a building.

FIG. 1 is a view illustrating a configuration of a code division multiple access (CDMA) communication system installed in a building. Referring to FIG. 1, a base station 120 is a private base station, installed in a building 100, in a private network of the in-building mobile communication system. The base station 120 performs processing of a transmission signal to be transmitted to a terminal (mobile station or MS), located in the in-building mobile communication system, and processing of a signal received from the terminal. The base station 120 has a configuration so as to perform modulation/demodulation and coding/decoding, thereby processing a code division multiple access (CDMA) communication function. The transmitter/receiver unit 110 up-converts a frequency of the signal received from the base station 120 to a frequency of a radio frequency band (RF-band), and outputs the radio frequency (RF) signal, while it down-converts the frequency of the received radio frequency (RF) signal to transmit to the base station 120. The transmitter/receiver unit 110 is connected in parallel with the plurality of small repeater units (RU). The transmitter/receiver unit transmits the forward radio frequency (RF) signal to the small repeater units, while transferring the reverse radio frequency (RF) signal received from the small repeater units to the base station 120.

The small repeater units are installed in appropriate positions in the building. The small repeater units are each positioned independently inside the sectionally divided rooms of a building. If the place is large, the small repeater units are separately positioned at desirable distances depending on radio environment. Each of the small repeater units includes a transmission amplifier 15 and a reception amplifier 17. The transmission amplifier 15 amplifies the signal outputted from the transmitter/receiver unit 110. The reception amplifier 17 filters the band of the transmission signal and transmits the filtered signal via an antenna 11, while it amplifies the signal received via the antenna 11 and outputs the amplified signal to the transmitter/receiver unit 110. Accordingly, respective small repeater units are connected in parallel to the transmitter/receiver unit 110. Small repeater units transmit the signal received from the transmitter/receiver unit 110 to the mobile station terminal (MS) via the antenna, while transferring the transmission signal received from the terminal to the transmitter/receiver unit via the antenna.

The constitution shown in FIG. 1 comprises small repeater units which may be installed on one floor of the building. The small repeater units shown in FIG. 1 may be distributed and installed on two or more floors if the area is small.

For its proper functioning, the in-building mobile communication system requires signals coming from external base stations to be released to the exterior of the building. To do this, many antennas should be installed in appropriate positions inside the building. The antennas installed at this time are connected through the small repeaters. As for the small repeaters, repeaters performing both transmission and reception are employed. These repeaters, however, have a problem of increasing reception interference of the reverse link in proportion to the number of the antennas.

Now, a description of a situation where reception interference of the reverse link (a transmission signal moving from the terminal to the base station) increases in the in-building mobile communication system is given in detail.

To implement a private mobile communication network in the in-building mobile communication system, many repeaters should be installed in the building. The network substantially needs only a constituent for the forward link, but all current repeaters include constituents for both the forward link and reverse link. In this connection, as more repeaters performing both transmission and reception are installed, there is a shortcoming that interference of the reverse link (reverse noise floor) increases.

Figure 2:
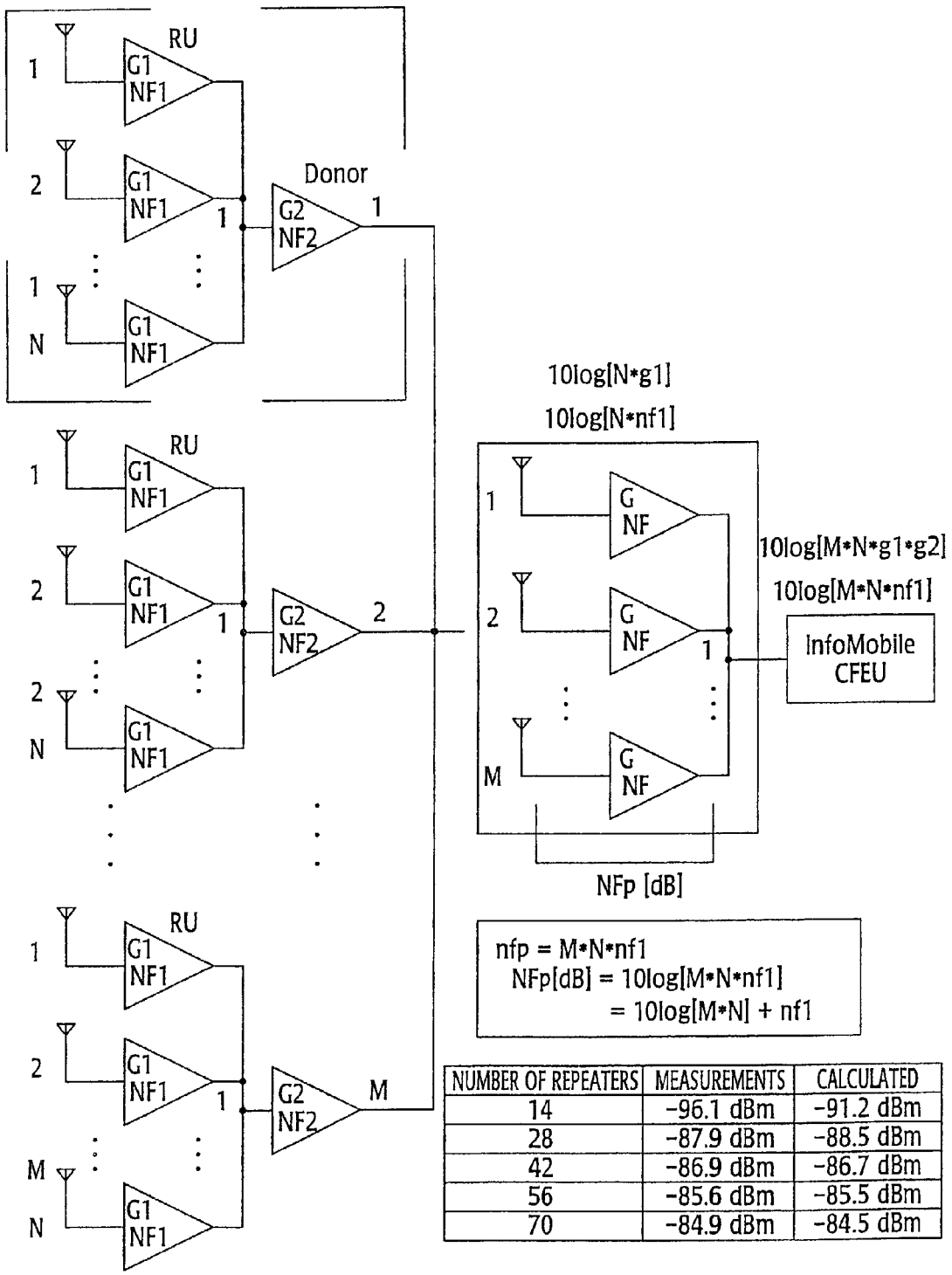
FIG. 2 is a view illustrating a configuration of a code division multiple access (CDMA) communication system installed in a building, in accordance with the principles of the present invention.
Figure 3:
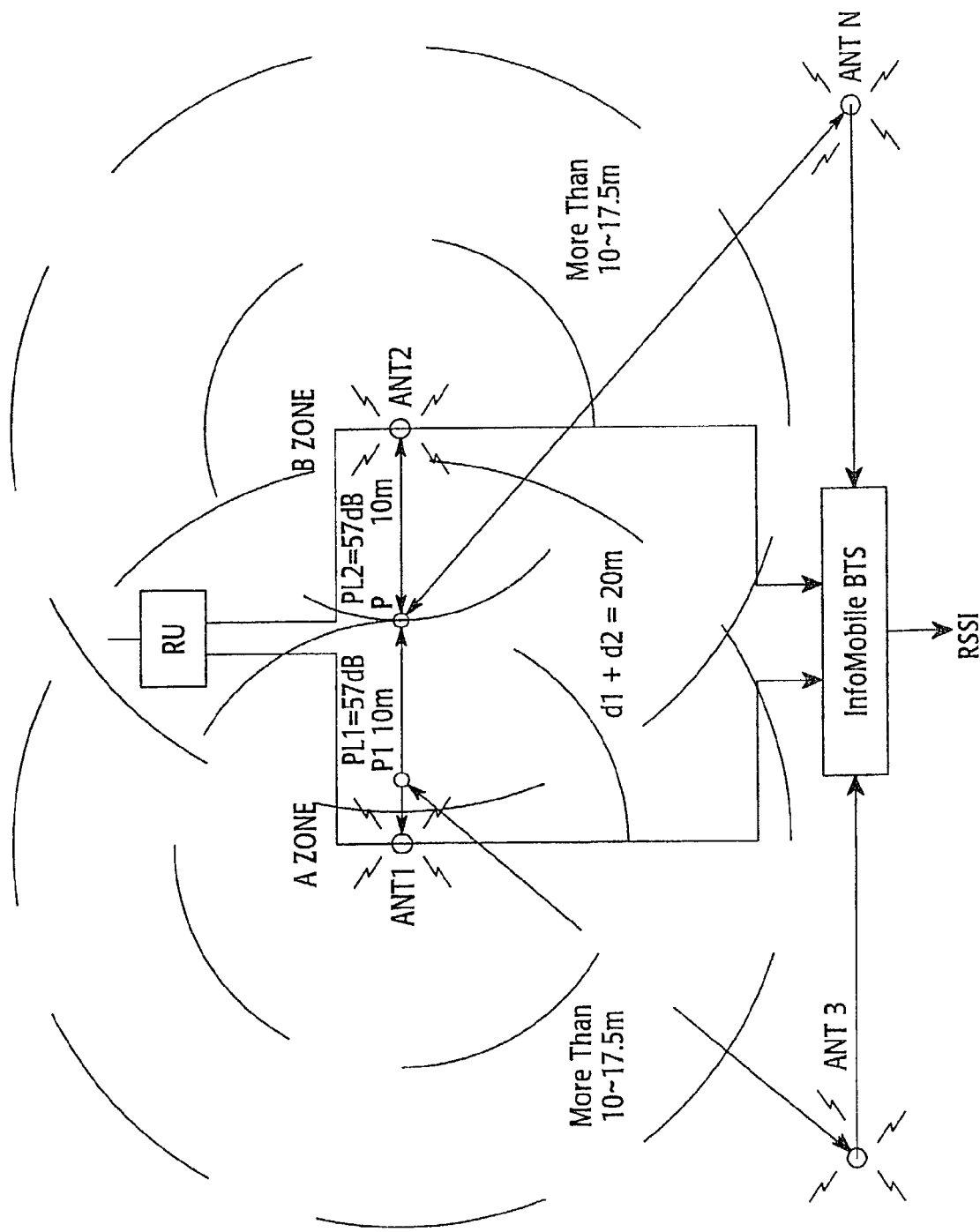
FIG. 3 is a view illustrating a block configuration of a mobile communication system as in FIG. 2, in accordance with the principles of the present invention.

FIG. 2 is a view illustrating a configuration of a code division multiple access (CDMA) communication system installed in a building, in accordance with the principles of the present invention. FIG. 3 is a view illustrating a block configuration of a mobile communication system as in FIG. 2, in accordance with the principles of the present invention.

FIGS. 2 and 3 show an increase of interference according to an increase of reception amplifiers (LNA: low noise amplifier) of repeaters, and an increase of interference according to an increase of antennas, in an in-building mobile communication system. That is, FIG. 2 is a view illustrating an increase of noise proportionally to the number of the repeaters in the in-building mobile communication system. FIG. 3 is a view illustrating an increase of noise in proportion to the number of the antennas in the in-building mobile communication system.

Referring to FIG. 2, one transmitter/receiver unit 110 is connected with the number N of small repeater units, and each small repeater unit includes an antenna 11 and a reception amplifier 17. In FIG. 2, assume that the reception amplifier 17 has a G1 gain, and NF (Noise Figure) is 5 decibels (dB). Also assume that the reception amplifier in the transmitter/receiver unit 110 has a G2 gain, and NF is approximately 5 dB. Assume that NF of the small repeater unit is nf1, and NF of the reception amplifier in the transmitter/receiver unit is nf2. Also assume that the base station 120 performs service for the number M of the transmitter/receiver units 110 having the above configuration. Considering the above conditions, reception signal strength of the reverse link, that is, received signal strength indicator (RSSI), in an idle status when no interference occurs around the base station, can be calculated as follows.

Received signal strength indicator (RSSI) of the reverse link=−108 dBm+10 log[NF]+10 log[number of repeater units connected in parallel]

That is, interference level with one transmitter/receiver unit 110 is 10 log[N*G1] and 10 log[N*nf1]. Interference level with the base station 100 is 10 log[M*N*G1*G2] and 10 log[M*N*nf1]. Thus, the entire interference can be expressed as follows.

$nfp = M*N*nf1$ $NFp[dB] = 10\log[M*N*nf1]$
$= 10\log[M*N] + nf1$

The calculated levels and measurements according to the number of the repeater units are shown in Table 1 below.

TABLE 1

| Number of repeaters | Measurements | Calculated levels |
|---|---|---|
| 14 | −96.1 dBm | −91.2 dBm |
| 28 | −87.9 dBm | −88.5 dBm |
| 42 | −86.9 dBm | −86.7 dBm |
| 56 | −85.6 dBm | −85.5 dBm |
| 70 | −84.9 dBm | −84.5 dBm |

FIG. 3 is a drawing explaining a received signal strength indicator (RSSI) increase of the base station 120 due to antennas of the two small repeater units nearest to the terminal and the terminal. In FIG. 3, assume that the output level of the terminal is fixed to 0 decibel meters (dBm) for convenience. Pass loss (PL) can be expressed as follows. In the following equation, f is a frequency (megahertz or MHz), and d is a distance (kilometers or Km).

$PL = 20*\log(f) + 20*\log(d) + 32.44 [dB]$

Received signal strength indicator (RSSI) increase of the base station 120 according to the number of the antennas as in the case of FIG. 3 is shown in Table 2 below.

TABLE 2

| Terminal position P → P1 | d1 + d2 | Distance d1 | Ant 1 RSSI | Distance d2 | Ant 2 RSSI | BTS RSSI (Ant1 + Ant2) | (Ant 1 + 2)-Ant1 |
|---|---|---|---|---|---|---|---|
| P | 20 m | 10 m | −57 dBm | 10 m | −57 dBm | −54 dBm | 3 dBm (−54 + 57) |
| P1 | 20 m | 5 m | −51 dBm | 15 m | −60 dBm | −50 dBm | 1 dBm (−50 + 51) |
| P1 | 20 m | 2.5 m | −45 dBm | 17.5 m | 62 dBm | 45 dBm | 0 dBm (−45 + 45) |

As shown in Table 2, the received signal strength indicator (RSSI) increase according to the number of the antenna on a same floor in the building is based on just two antennas nearest to the terminal, while the other antennas can be ignored. The maximum received signal strength indicator (RSSI) increase according to the increase of the antennas is approximately 3 dBm.

As described above, the in-building mobile communication system needs a plurality of antennas installed in the building to release radio waves of external base stations to the exterior of the building. The antennas are constructed such that the antennas are connected with the system through the small repeater units, as illustrated in FIG. 1. The small repeater units include transmission and reception amplifiers capable of processing signals of both forward and reverse links. As a result, in implementing the in-building mobile communication system, such expanded antennas for the forward link network have a problem of increasing reception interference due to many reception amplifiers for the reverse link.

To try to overcome the above problem, Howard H. Xia et al. presented a method disclosed in a paper entitled "A CDMA-Distributed Antenna System for In-Building Personal Communications Services" (IEEE Journal on selected areas in communications, Vol. 14, No. 4, May 1996, pp644-650). The method is designed to suppress a reception noise increase in an in-building mobile communication system.

According to the method, respective repeaters employ delay elements to reduce reception noise. In other words, if the radio waves of signals are delayed at 0.814 microseconds (μsec) or more, a rake receiver recognizes the signals to be not noise but distinct signals. Such signals are synthesized, thereby increasing signal strength. However, such delay of above 0.814 μsec requires a distance of more than about 244 meters (m) between repeaters. Thus, the method of Howard H. Xia et al. has a problem in that it is difficult to achieve delay of more than microseconds (μsec).

Now, preferred embodiments of the present invention will be described in more detail with reference to the attached drawings. In the drawings, the same or similar elements are denoted by the same reference numerals even though they are depicted in different drawings.

In the following descriptions, particulars such as strength of a reception signal, distance of a small repeater installed from another, etc., are provided for a more general understanding of the invention. Those skilled in the art will realize that various modifications of the particulars disclosed herein can be made without departing from the spirit and scope of the invention.

In implementing an in-building mobile communication system, radio waves received from external base stations can be removed by installing many repeaters inside the building. Practically, the in-building mobile communication system is implemented by installing small repeaters at a certain distance interval (5 to 10 m). In an in-building mobile communication system according to the invention, small repeaters are installed in the building as follows. A transmission/reception repeater capable of performing two-way transmission is installed in the center. Transmission repeaters performing one-way transmission, while not processing a reverse link signal (that is, there being no receiving unit), are installed within 5 to 10 m away from the transmission/reception repeater and within line of sight (LOS). On the other hand, in the case either that a repeater's position is more than 5 to 10 m away from the transmission/reception repeater positioned in the center or that a repeater's position departs from line of sight (LOS), though being within 5~10 m away therefrom, the transmission/reception repeater performing two-way transmission is installed. That is, in the case that a repeater will be installed in a position surrounded by thick walls, the transmission/reception repeater performing two-way transmission should be installed. Thus, the in-building mobile communication system according to a preferred embodiment of the invention can maximize suppression of reverse link interference within the building, by minimizing the constitution of receiving units, which cause reception interference (that is, as far as possible, only one repeater performing two-way transmission is installed in the center of the building, and additional such repeaters are employed only when necessary).

Figure 4:
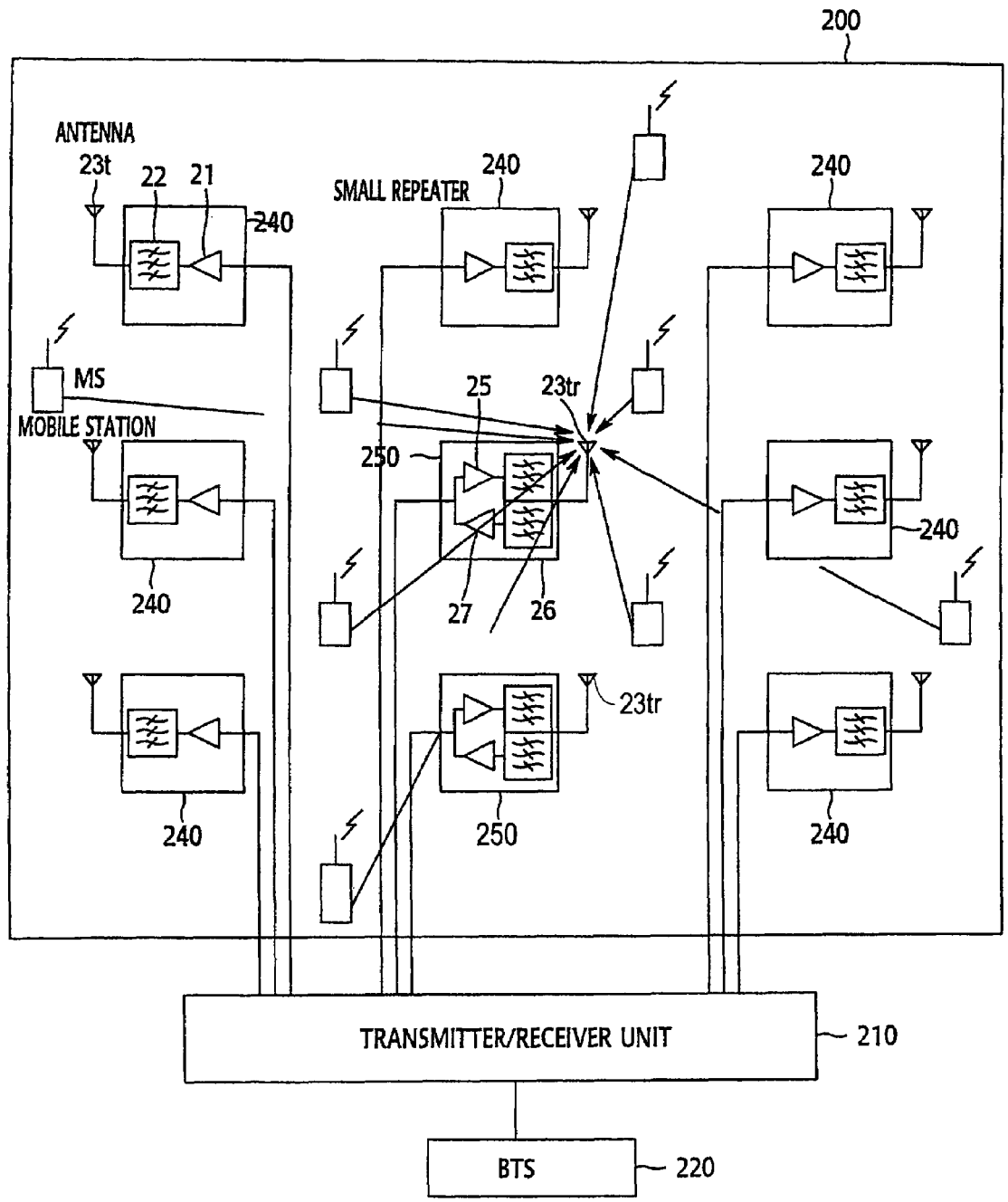
FIG. 4 is a view for analyzing an influence on received signal strength indicator (RSSI), upon increasing antennas in a mobile communication system having a configuration as in FIG. 2, in accordance with the principles of the present invention.

FIG. 4 is a view for analyzing an influence on received signal strength indicator (RSSI), upon increasing antennas in a mobile communication system having a configuration as in FIG. 2, in accordance with the principles of the present invention. FIG. 4 is a view illustrating a configuration of an in-building mobile communication system according to a preferred embodiment of the invention.

Referring to FIG. 4, the base station 220 is a private base station which is installed within the building 200 in a private communication network of the in-building mobile communication system. The base station 220 performs processing of a transmission signal to be transmitted to the terminal (mobile stations, MS), the terminal being located in the in-building mobile communication system, and processing of a signal received from the terminals. The base station 220 has a configuration so as to perform modulation/demodulation and coding/decoding, thereby processing a CDMA communication function. The transmitter/receiver unit 210 up-converts the signal received from the base station 220 to an RF-band, and outputs the radio frequency (RF) signal, while it down-converts the received radio frequency (RF) signal to transmit to the base station 220. The transmitter/receiver unit 210 is connected in parallel with the plurality of transmission repeaters 240 and transmission/reception repeaters 250. The transmission repeaters 240 and the transmission/reception repeaters 250 are connected to the transmitter/receiver unit 210 by cables, and are disposed at a proper location apart from each other in a building. The transmitter/receiver unit 210 transmits the forward radio frequency (RF) signal to the transmission repeaters 240 and transmission/reception repeaters 250, while transferring the reverse radio frequency (RF) signal received from the transmission/reception repeaters 250 to the base station 220.

The transmission repeaters 240 and the transmission/reception repeaters 250 are installed in appropriate positions in the building. The transmission/reception repeaters 250 are each positioned independently inside the sectionally divided rooms of a building. If the place is wide, at least one transmission/reception repeater 250 and a plurality of the transmission repeaters 240 are separately positioned at desirable distances depending on radio environment. The transmission repeater 240 faces the transmission/reception repeater 250, which means that they are arranged to be in sight of each other, without any obstacles such as walls or other objects blocking a path between them.

The transmission repeaters 240 are small repeaters and do not include a receiving unit. That is, each of the transmission repeaters 240 includes a transmission amplifier 21 and a wave filter 22 for a transmission band. The transmission amplifier 21 amplifies the signal outputted from the transmitter/receiver unit 210. The wave filter 22 for a transmission band performs bandpass-filtering of the transmission signal and transmits the filtered signal through an antenna 23t. The transmission repeaters 240 are separately installed at appropriate distances (about 5~10 meters, within line of sight (LOS)) away from the transmitter/receiver unit, depending on radio environment.

The transmission/reception repeaters 250 may be installed near the center (or substantially at the center) of the building, at a position within line of sight (LOS) and more than 10 meters (m) away from any other transmission/reception repeater 250, or at a position at which radio waves cannot reach because of the walls. Each of the transmission/reception repeaters 250 includes a transmission amplifier 25, a duplexer 26 and a reception amplifier 27. The transmission amplifier 25 amplifies the signal outputted from the transmitter/receiver unit 210. The duplexer 26 filters the band of the transmission signal and transmits the filtered signal through an antenna 23tr, while it filters the band of the signal received through the antenna 23tr. The reception amplifier 27 amplifies the reverse reception signal which is subjected to bandpass-filtering through the duplexer 26 and outputs the amplified signal to the transmitter/receiver unit 210. Accordingly, the transmission/reception repeaters 250 are connected to the transmitter/receiver unit 210. The transmission/reception repeaters 250 transmit the signal received from the transmitter/receiver unit 210 to the mobile station terminal (MS) via the antenna 23tr, while transferring the transmission signal received from the antenna 23tr to the transmitter/receiver unit 210.

The antenna 23tr mounted to the transmission/reception repeater 250 is a transmission/reception antenna 23tr for transmitting signals to terminals and for receiving signals from terminals. However, the antenna 23t mounted to the transmission repeater 240 is a transmission antenna 23t for transmitting signals but not receiving signals.

The configuration of FIG. 4 shows transmission repeaters 240 and a transmission/reception repeater 250 which may be installed on one floor within the building 200. FIG. 4 proposes that there is one transmission/reception repeater 250 and the plurality of transmission repeaters 240. Under the space environment similar to FIG. 4, if radio waves fail to reach the building's interior due to barriers created by interior walls, the transmission/reception repeaters 250 are additionally installed in the necessary place of the building. As shown in FIG. 4, a second transmission/reception repeater 250 is installed because the building 200 has an interior wall. The interior wall is shown between the two transmission/reception repeaters 250.

A description about standards in designing the in-building mobile communication system of the invention, as shown in FIG. 4, is given in more detail.

First, forward link coverage (base station to mobile station) (BS→MS) in the in-building mobile communication system is considered.

Received signal strength indicator (RSSI) and energy of carrier/interference of others (Ec/Io) of public mobile communication networks, coming from many public networks, are measured in each floor of the building. The energy of carrier/interference of others (Ec/Io) is a signal quality of a pilot channel. Considering the measurements, if a radio wave of a public network is too strong, the in-building mobile communication system can be implemented. Accordingly, in this situation, it is necessary to consult with a service provider of the corresponding public network. Output of the base station's antenna which offers service toward the building, thus, should be reduced, and a direction of the antenna should be changed, thereby weakening strength of the radio wave, finally implementing the in-building mobile communication system.

Here, it is about −63 decibel meters (dBm) or more received signal strength indicator (RSSI) of the public network in the building or about −5 decibels (dB) or more Ec/Io is (changeable depending on the situation) that the forward link radio wave cannot be implemented in the in-building mobile communication system. The reasons for that are as follows. Because the maximum electric power, which is available without permission of a radio station, for a small repeater is 100 milliwatts (mW), provided that the number of frequency assignment (FA) is 3 in the case of an internal base station (called InfoMobile), the maximum output level of the repeater is 10 dBm/3 FA, while being 5 dBm per FA (that is, 5 dBm/FA). If an extra signal strength of about 3 dB is allowed for peak hour calls (provided herein that about 13 calls are made), the output is 2 dBm (1.58 mW)/FA. The term "Frequency Assignment" (FA) relates to a frequency assignment according to terminals at a base station. At this time, since a digital gain of a pilot channel (PI Ch) is 108 dB, output of the pilot channel can be calculated by the equation below.

$PI\ Ch$: 1.58 mW*(108/127)$^2$=0.56 dBm(1.14 mW)≈0 dBm

That is, in an idle state (no calls being made), the output of the repeater over the pilot channel should be about 0 dBm.

A simple equation for determining pass loss on a free space is as follows.

$PL$(pass loss)=20*Log($f$)+20*Log($d$)+32.44[dB]

In the above equation for pass loss, f is a frequency (MHz) and d is a distance (Km). According to the equations, the pilot channel strength of the repeater within a 10 m radius is calculated as follows, and the level is about −57.7 dBm.

Pilot strength (within a 10 m radius)=0 dBm (initial pilot strength)−$PL$(57.5 dB)=−57.7 dBm $PL$=20*Log(1845 MHz)+20*Log(10 m/1000 m)+32.44=57.7 dB That is, the pilot strength within about 10 m radius from the repeater is about −58 dBm. Considering peak hour calls, an extra signal strength of about 5 dB is allowed so as to ensure that the radio wave strength of an external public network in the building is −63 dBm or less. The repeater is installed to ensure that the position is within 5~10 m from the window, considering the measured radio wave strength of the external public network (similarly in the inside of the building). The pilot signal strength (Ec/Io) is controlled to be −4 dB or more at the windows (for off-peak hour calls, that is, 2 calls or less being made).

Since Ec/Io is reduced by about 3 dB (−4 dB −3 dB) for peak hour calls (about 13 calls being made), the Ec/Io comes to −7 dB. Provided that the strongest strength the external public network at the window is that Ec/Io=−5 dB, no hand-over is performed, while synchronizing with the internal base station (InfoMobile). The hand-over is performed when a difference between the pilot strengths is more than 3 dB, while not being performed when the difference is less than 2 dB.

Second, reverse link coverage (mobile station to base station) (MS→BS) in the in-building mobile communication system is considered.

In implementing the in-building mobile communication network as a private network, many repeaters should be installed in the building. Practically, if small repeaters are installed (the repeaters performing both transmission and reception), then reverse link interference is brought about. In this connection, as more small repeaters performing both transmission and reception are installed, interference of the reverse link (reverse noise floor) increases. FIGS. 2 and 3 show an interference increase according to the increase of low noise amplification (LNA) of the repeaters and the increase of antennas, as described above.

In accordance with the principles of the present invention, it is preferable that the small repeaters contain only the forward link constituent. Since the number of the reception amplifiers and antennas increase as many repeaters are involved, noise increases. Therefore, performance of the in-building mobile communication system can be improved by minimizing the number of antennas and reception amplifiers.

As described in the description of the forward link coverage, in installing the small repeaters at a certain distance interval of 5 to 10 m, the small repeaters performing two-way transmission, capable of offering service of transmission and reception, are installed in the center of the building. In addition, transmission repeaters performing one-way transmission, while having a configuration without a reception amplifier, are installed within 5 to 10 m away from and within line of sight (LOS) of the transmission/reception repeater. On the other hand, in the case either that a repeater's position is more than 5 to 10 m away from the transmission/reception repeater positioned in the center of the building or that a repeater's position departs from line of sight (LOS), though being within 510 m, the transmission/reception repeater performing two-way transmission is installed. That is, in the case that a repeater will be installed in a position surrounded by thick walls, the transmission/reception repeater performing two-way transmission should be installed.

As apparent from the above description, in implementing the in-building mobile communication system, the apparatus and method according to the invention can suppress the repeater's reverse link interference, thereby improving reverse link subscriber's terminal capacity, and so being advantageous.

The foregoing paragraphs describe the details of the present invention as it relates to an apparatus and method for suppressing interference of a signal received in a reverse link in a code division multiple access (CDMA) communication system, and more particularly, as the present invention relates to an apparatus and method for suppressing interference of a signal received in a reverse link in a communication system installed in a closed space such as a building.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An in-building mobile communication system, the system comprising:
   a first transmission/reception repeater being installed substantially at a center of a building, said first transmission/reception repeater performing transmission to a plurality of terminals through a transmission/reception antenna and performing reception from a plurality of terminals through the transmission/reception antenna;
   at least one transmission repeater being installed a preset distance away from said first transmission/reception repeater, said at least one transmission repeater performing transmission to at least one of the terminals, said at least one transmission repeater not performing reception from any of the terminals;
   at least one transmitter/receiver unit being connected in parallel with said first transmission/reception repeater and with said at least one transmission repeater; and
   a base station device being connected with said at least one transmitter/receiver unit.

2. The system of claim 1, said at least one transmission repeater facing said first transmission/reception repeater.

3. The system of claim 1, said at least one transmission repeater comprising:
   a transmission antenna; and
   a transmission amplifier amplifying a signal outputted from said at least one transmitter/receiver unit to perform propagation of a forward link signal through said transmission antenna.

4. The system of claim 3, the preset distance between said at least one transmission repeater and said first transmission/reception repeater corresponding to about 5 meters to 10 meters.

5. The system of claim 3, further comprising a second transmission/reception repeater being installed in a position spaced away from said first transmission/reception repeater, the position being near the center of the building.

6. The system of claim 5, said second transmission/reception repeater being installed when an obstacle exists near a center of a building, the obstacle blocking radio frequency signals.

7. The system of claim 3, further comprising a second transmission/reception repeater, the preset distance between said at least one transmission repeater and said first transmission/reception repeater corresponding to about 5 meters to 10 meters, said second transmission/reception repeater being installed in a position which is more than 10 meters away from said first transmission/reception repeater.

8. The system of claim 1, said first transmission/reception repeater comprising:
   a transmission amplifier amplifying a signal outputted from said at least one transmitter/receiver unit;
   a duplexer being connected between said transmission amplifier and the transmission/reception antenna, said duplexer performing bandpass-filtering of a transmission signal of said transmission amplifier and outputting the bandpass-filtered signal to the transmission/reception antenna, said duplexer performing bandpass-filtering of a reception signal received through the transmission/reception antenna; and
   a reception amplifier amplifying the reception signal received from said duplexer and outputting the amplified signal to said at least one transmitter/receiver unit.

9. The system of claim 8, the preset distance between said at least one transmission repeater and said first transmission/reception repeater corresponding to about 5 meters to 10 meters.

10. The system of claim 8, further comprising a second transmission/reception repeater being installed in a position spaced away from said first transmission/reception repeater, the position being near the center of the building.

11. The system of claim 10, said second transmission/reception repeater being installed when an obstacle exists near a center of a building, the obstacle blocking radio frequency signals.

12. The system of claim 8, further comprising a second transmission/reception repeater, the preset distance between said at least one transmission repeater and said first transmission/reception repeater corresponding to about 5 meters to 10 meters, said second transmission/reception repeater being installed in a position more than 10 meters away from said first transmission/reception repeater.

13. A process for suppressing interference with the communication system of claim 1, comprised of:
   performing forward and reverse communication with at least one of the terminals through the transmission/reception repeater; and
   performing forward communication with the one of the terminals through the transmission repeater.

14. A process for suppressing interference with the communication system of claim 3, comprised of:

performing forward and reverse communication with at least one of the terminals through the transmission/reception repeater; and performing forward communication with the one of the terminals through the transmission repeater.

15. A process for suppressing interference with the communication system of claim 5, comprised of:

performing forward and reverse communication with at least one of the terminals through the transmission/reception repeater; and performing forward communication with the one of the terminals through the transmission repeater.

* * * * *